United States Patent
Shin et al.

(10) Patent No.: US 6,415,035 B1
(45) Date of Patent: *Jul. 2, 2002

(54) INFORMATION PROCESSING APPARATUS HAVING SPEAKERS

(75) Inventors: Takahiro Shin; Masuo Ohnishi, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/840,458

(22) Filed: Apr. 18, 1997

(30) Foreign Application Priority Data

Oct. 24, 1996 (JP) .............................. 8-282411

(51) Int. Cl.⁷ .............................. H04R 25/00
(52) U.S. Cl. ...................... 381/388; 381/306; 381/333; 361/683
(58) Field of Search .......................... 381/88, 90, 188, 381/205, 24, 306, 333, 388, 386, 387, 345; 361/680, 681, 682, 683; 181/141

(56) References Cited

U.S. PATENT DOCUMENTS

| | | | | |
|---|---|---|---|---|
| 4,509,184 A | * | 4/1985 | Yanagawa ................... | 381/335 |
| 4,696,370 A | * | 9/1987 | Tokumo et al. ............. | 181/141 |
| 5,400,408 A | * | 3/1995 | Lundgren et al. ........... | 381/159 |
| 5,553,149 A | * | 9/1996 | Freadman ................... | 381/333 |
| 5,613,011 A | * | 3/1997 | Chase et al. ................ | 381/361 |
| 5,668,882 A | * | 9/1997 | Hickman et al. ............. | 381/88 |
| 5,689,574 A | * | 11/1997 | Heirich et al. ................ | 381/87 |
| 5,694,293 A | * | 12/1997 | Seto et al. ................... | 361/683 |
| 5,732,140 A | * | 3/1998 | Thayer ........................ | 381/332 |
| 5,734,733 A | * | 3/1998 | Starch ........................ | 381/388 |
| 5,825,614 A | * | 10/1998 | Kim ........................... | 361/683 |

FOREIGN PATENT DOCUMENTS

| | | |
|---|---|---|
| EP | 0 564 092 | 6/1993 |
| EP | 0 564 092 | 10/1993 |
| EP | 0 575 895 | 12/1993 |
| EP | 0 635 777 | 1/1995 |
| JP | 8-076885 | 3/1996 |

OTHER PUBLICATIONS

Patent Abstracts of Japan, vol. 018, No. 149 (P–1708), Mar. 11, 1994.

Yoshito, Saji et al., Patent Abstracts of Japan, vol. 018, No. 149 (P–1708), Mar. 11, 1994.

Tetsuyuki, Watanabe et al., Patent Abstracts of Japan, vol. 096, No. 011, Nov. 29, 1996.

* cited by examiner

*Primary Examiner*—Huyen Le
(74) *Attorney, Agent, or Firm*—Staas & Halsey LLP

(57) ABSTRACT

An information processing apparatus has a pair of speakers. A body has a reference surface thereof and provided with a keyboard section, the keyboard having a shaft to which a display section is pivotably connected. The display section is constituted as a lid portion for said body. Each speaker has a sound radiation surface and the pair of speakers are arranged at the left and right sides, respectively, in such a manner that the sound radiation surface is oblique with respect to said reference surface of the body.

35 Claims, 6 Drawing Sheets

INFORMATION PROCESSING APPARATUS HAVING SPEAKERS

BACKGROUND OF THE INVENTION

1. Field of the Invention

This invention relates to an information processing apparatus such as a personal computer or a word processor. More specifically, this invention relates to a thin, light-weight information processing apparatus having speakers.

As information processing apparatuses have become wide spread in recent years, an improvement in portability of these apparatuses has been required. Therefore, an information processing apparatus which is small in size and thickness and light in weight must be provided. On the other hand, to satisfy the compatibility of these apparatuses with multimedia, speakers must be provided in them and the sound quality of the speakers must be improved, as well. This means that a small and thin information processing apparatus having high sound quality must be provided.

2. Description of the Related Art

An example of conventionally known information processing apparatuses according to the prior art with built-in type speakers includes a pair of speakers provided at respective side surfaces of the main body of the apparatus. The speakers of this apparatus are fitted in such a fashion that their sound radiation surfaces (or their fitting surfaces) are parallel respective side surfaces of the main body of the information processing apparatus.

Since the speakers are fitted so that their sound radiation surfaces are parallel to the side surface of the apparatus main body according to this prior art example, the thickness of the information processing apparatus is limited by the height of the sound radiation surfaces of the speakers, and the thickness cannot be reduced so easily.

In another prior art example, a pair of speakers is disposed on respective sides of the rear part of the upper surface (the surface on which an operation surface is positioned) of the apparatus main body. In this example, the speakers are disposed in such a manner that their sound radiation surfaces are parallel to the upper surface, i.e., the operation surface, of the apparatus main body. That is, the sound radiation surfaces of the speakers exist on the projection surface of the information processing apparatus. However, because the sound radiation surfaces of the speakers exist on the projection surface of the information processing apparatus main body, the speaker surfaces cannot be secured in relation with the area of the operation surface, and speakers having sufficient sizes cannot be mounted.

In still another prior art example, the speakers are allowed to swell out from respective sides surfaces of the main body of the information processing apparatus when they are used. The speakers are fitted so that their sound radiation surfaces are situated on the upper surface of the swelling portions. Because the speakers 2 are allowed to swell out from the apparatus main body 1 during use, however, the swelling portions are cumbersome, and remarkably impede portability of the information processing apparatus.

Incidentally, Japanese Unexamined Patent Publication (Kokai) No. 8-76885 describes an example wherein the speakers are disposed on a peripheral processing substrate, disposed separately from a main substrate, in order to reduce the thickness of the apparatus main body in an information processing apparatus having speakers.

Though the prior art reference described above contemplates to reduce the thickness of the apparatus main body by disposing the speakers on the peripheral processing substrate, separate from the main substrate, the size of the speakers and their dispositions are limited because they are disposed on the peripheral processing substrate, and there is an inherent limit to the improvement of sound quality of the speakers.

SUMMARY OF THE INVENTION

It is therefore an object of the present invention to provide an information processing apparatus having speakers in which an increase of the sound projection area of the information processing apparatus, due to the provision of the speakers, can be significantly diminished, the thickness of its main body can be reduced, and a sound quality of the speakers is improved.

According to the present invention, there is provided an information processing apparatus having at least one speaker, said apparatus comprising: a body of said information processing apparatus, said body having a reference surface thereof; and said speaker having a sound radiation surface which is oblique with respect to said reference surface of the body.

In another aspect, there is provided an information processing apparatus having at least a pair of speakers, said apparatus comprising: a body of said information processing apparatus, said body having a reference surface and respective left and right sides thereof; and said pair of speakers arranged at said left and right sides, respectively, each of said speakers having a sound radiation surface which is oblique with respect to said reference surface of the body.

According to a still another aspect, there is provided an information processing apparatus having at least a pair of speakers, said apparatus comprising: a body of said information processing apparatus, said body having a reference surface thereof; and an extended station on which said body is detachably mounted and said extended station having left and right sides thereof; and said pair of speakers arranged at said left and right sides, respectively, each of said speaker having a sound radiation surface, in such a manner that said sound radiation surface is oblique with respect to said reference surface of the body; and said extended station having respective gaps, each of which is defined at a front part of said sound radiation surfaces of the respective speaker, when said body is mounted on said extended station.

According to still another aspect of the present invention, there is provided an information processing apparatus having at least a pair of speakers, said apparatus comprising: a body of said information processing apparatus, said body having a reference surface thereof and provided with a keyboard section; a display section; said body having a shaft to which said display section is pivotably connected; said display section being constituted as a lid portion for said body; said pair of speakers arranged at said left and right sides, respectively, and each of said speakers having a sound radiation surface which is oblique with respect to said reference surface of the body.

When the speakers are fitted obliquely so that their sound radiation surfaces are oblique with respect to the reference surface (for example, an operation surface or side surfaces) of the main body of the information processing apparatus, the height can be remarkably reduced and the apparatus main body can be made far thinner than when the speakers are fitted to the side surfaces of the information processing apparatus. Further, the installation area of the speakers on the projection plane can be reduced in comparison with the case where the speakers are disposed so that their sound radiation surfaces exist on the projection plane of the information processing apparatus main body, and the areas of the sound radiation surfaces of the speakers can be sufficiently secured.

A gap is defined at the front part of each of the sound radiation surfaces of the speakers. According to this arrangement, the gap portions at the front surface portions of the speakers serve as sound diffusion areas and a sound quality of the speakers can be improved.

DESCRIPTION OF THE PREFERRED EMBODIMENTS

Hereinafter, some preferred embodiments of the information processing apparatus according to the present invention will be explained in detail with reference to the accompanying drawings.

Figure 1A:
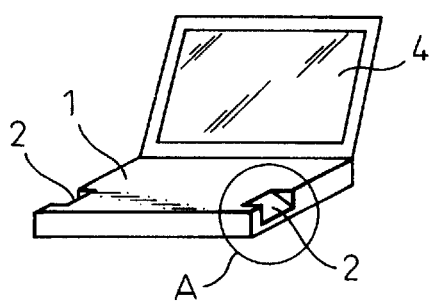
FIG. 1(a) is a perspective view of an information processing apparatus having speakers of this invention according to the first embodiment of the invention.
Figure 1B:
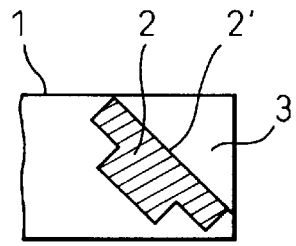
FIG. 1(b) is an enlarged sectional view of a portion A in FIG. 1(a)

FIG. 1(a) shows an embodiment wherein a pair of speakers 2 are obliquely disposed at respective right and left sides, toward the front of the upper surface where an operation panel of the main body 1 of the information apparatus is situated. FIG. 1(b) is a detailed sectional view of a portion A in FIG. 1(a). A pair of notch portions 3 are provided at the respective correspondingly fixed locations right and left front end positions of the upper surface of the main body 1 in such a manner that they incline progressively downwardly towards the right and left ends in fixed relationship relatively to a main surface of the body 1 and their tops are open, respectively, and the speakers 2 are fixedly fitted to these notch portions 3, respectively and mounted to the body 1 so as to be immobile with respect to the body 1. Therefore, the sound radiation surface 2' of each speaker 2 inclines progressively downwardly towards the side bottom edge at a fixed relationship with respect to the operation panel which is a horizontal surface. In this connection, reference numeral 4 in FIG. 1 denotes a liquid crystal display portion.

Figure 2A:
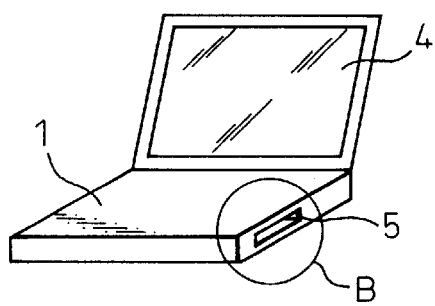
FIG. 2(a) is a perspective view of an information processing apparatus having speakers of this invention according to the second embodiment.
Figure 2B:
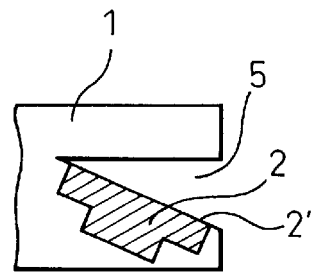
FIGS. 2(b) and 2(c) are enlarged sectional views of a portion B in FIG. 2(a)
Figure 2C:
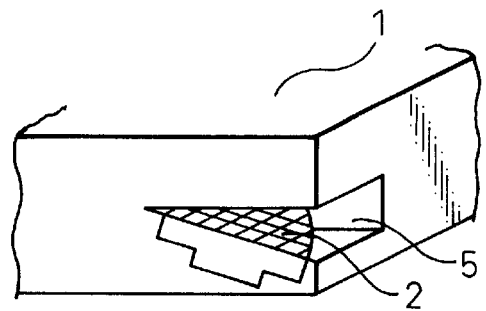

Referring to FIG. 2(a), notch portions 5 are defined at corresponding fixed locations in front portions of right and left side walls of the main body 1 in such a manner that they open towards the side walls and their upper portions are closed or covered respectively. The lower surface of each notch portion 5, that is, the fitting surface of the speaker 2, inclines progressively downwardly towards the right or left end in fixed relationship relatively to a main surface of the body 1. FIGS. 2(b) and 2(c) are detailed sectional views of portion B in FIG. 2(a). As shown in these drawings, the speaker 2 is fitted to the slope surface of this notch portion 5 at a fixed relationship. Therefore, the speaker 2 is fitted on the lower surface of, and inside, this notch portion 5 in such a manner as to incline progressively downwardly towards the side edge of the main body 1 and mounted to the body 1 so as to be immobile with respect to the body 1. In this embodiment, therefore, the gap (notch portion) 5 exists in front of the sound radiation surface 2' of the speaker 2, and this gap 5 has across-sectional area which progressively increases towards the side edge of the main body 1 of the information processing apparatus, and defines the sound diffusion area from the speaker 2. In this way, the tone quality of the speaker 2 can be improved.

Figures 3A, 3B:
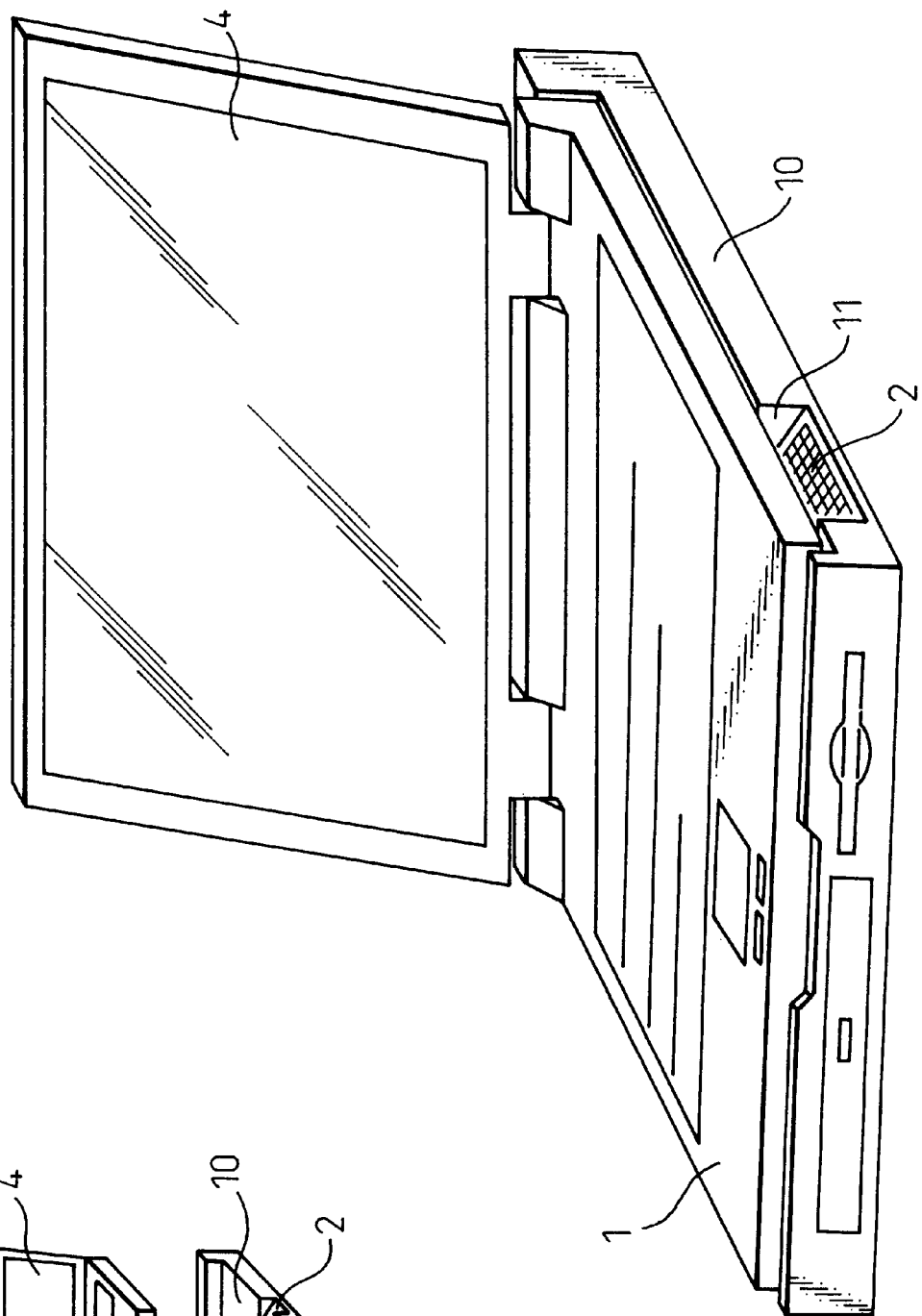
FIG. 3(a) is an exploded perspective view of an information processing apparatus having speakers of this invention according to the third embodiment.
FIG. 3(b) is a perspective view showing the state where the main body of the information processing apparatus is loaded to an extended station.

FIGS. 3(a) and 3(b) show another embodiment wherein the speakers are not provided on the main body 1 of the information processing apparatus, but are fitted to an extended (docking) station 10, and so a to be immobile relatively thereto, to which the main body 1 of the information processing apparatus can be removably fitted. FIG. 3(a) shows a state before the main body 1 is loaded to the station and FIG. 3(b) shows a state after the main body 1 is loaded to the extended station 10. Both of the drawings are perspective views.

The information processing apparatus per se, which can be loaded to the extended station 10, is well known. Generally, when the main body 1 of the information processing apparatus is loaded to the extended station 10, their connectors (not shown) are mutually fitted, and the main body 1 of the information processing apparatus and the extended station 10 are electrically connected with each other.

When the main body 1 of the information processing apparatus is loaded onto the upper surface of the extended station 10 in this embodiment both front and rear sides of the extended station 10 somewhat protrude from the main body 1 of the information processing apparatus as shown in FIG. 3(b) but their side portions are superposed with one another. In this embodiment, notch portions 11 are defined at respective side positions, disposed toward the front part of the upper surface of the extended station 10 in such a manner that they incline progressively downwardly towards the right and left sides and the upper side of the extended station 10 is open, and the speakers 2 are fitted into the notch portions 11, respectively. Therefore, the sound radiation surface of each speaker 2 inclines progressively downward towards the side edge of the extended station 10.

When the information processing apparatus main body 1 is loaded onto the upper surface of the extended station 10, the gap (notch portion) 11 the sectional area of which progressively expands in a direction towards the side end of the extended station 10, is defined in front of each speaker 2 in the same way as in the embodiment shown in FIG. 2 wherein the bottom surface of the main body 1 of the information processing apparatus closes the open surface of the notch 11. This gap 11 defines the sound diffusion area from the speaker 2 in the same way as in the embodiment shown in FIG. 2, and sound quality of the sound generated from the speaker 2 can be improved.

Figure 4:
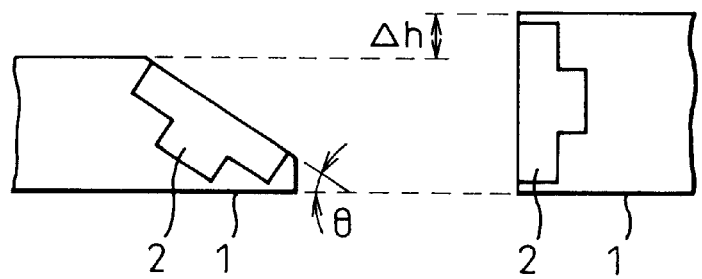
FIG. 4 is an explanatory view showing the change of size when the speaker is inclined from the state where it is disposed on the side surface of the main body.
Figure 5A:
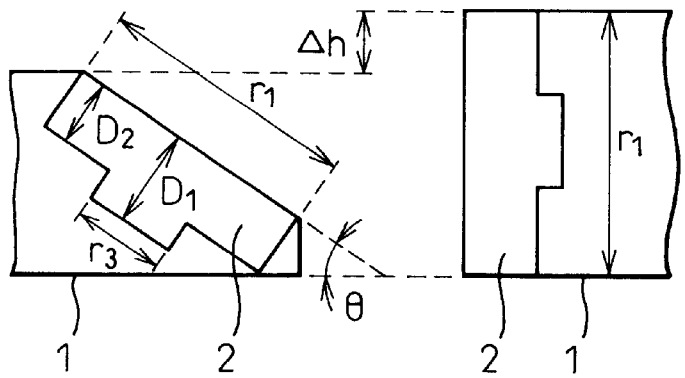
FIG. 5(a) is an explanatory view showing the change of size when the outer peripheral portion of the speaker comes into contact with the main body.
Figure 5B:
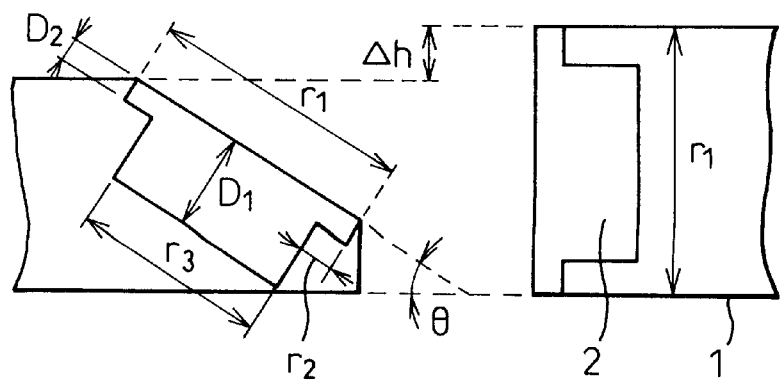
FIG. 5(b) is an explanatory view showing the change of size when the center portion of the speaker comes into contact with the main body.
Figure 6:
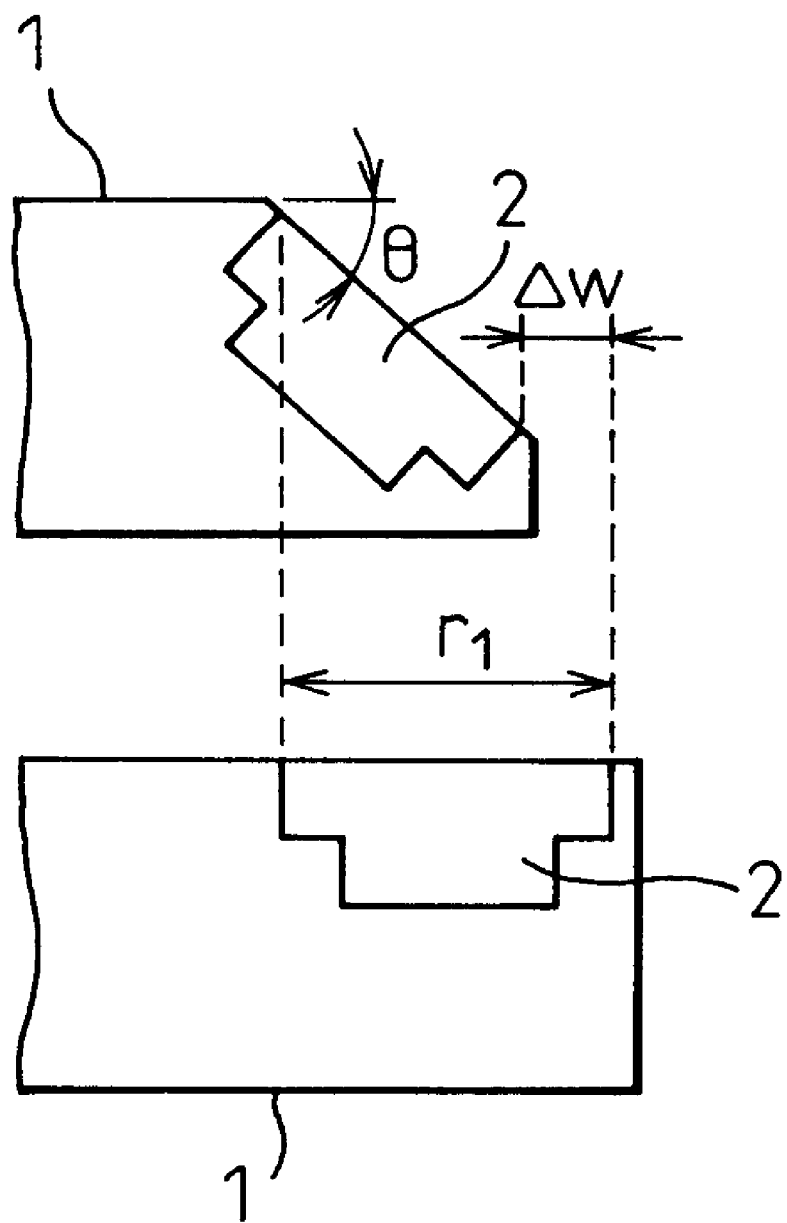
FIG. 6 is an explanatory view showing the change of size when the speaker is inclined from the state where it is disposed on an operation surface of the main body.

FIGS. 4 to 6 show the change of dimension when the speakers are disposed obliquely. FIG. 4 shows the case where the speaker 2 is fitted in parallel to the side surface of the main body 1 of the information processing apparatus on the right side (prior art example) and the speaker 2 is fitted obliquely at an angle, θ with reference to the reference surface (operation surface as the horizontal plane) of the main body 1 on the left side (this invention). In this case, symbol Δh represents the decrement in the direction of thickness.

In FIG. 5, the speaker has an outer diameter $r_1$, a thickness $D_1$ at the center and a thickness $D_2$ at an outer peripheral portion. FIG. 5(a) shows the case where the speaker 2 is brought into contact with the main body portion 1 of the information processing apparatus, at its thickness portion ($D_2$), when it is disposed obliquely with the sound radiation surface thereof facing up, and FIG. 5(b) shows the case where it is brought into contact with the main body portion (1) of the information processing apparatus, at the thickness portion ($D_1$) at the center when the speaker 2 is disposed obliquely with the sound radiation surface thereof facing up.

In FIG. 5(a), the decrement of thickness Δh in the direction of height shown on the left side, which represents the embodiment of the invention, becomes as follows in comparison with the case (prior art example) where the speaker 2 is fitted in parallel to the side surface of the information apparatus main body 1 shown on the right side:

$$\Delta h = r_1 - (r_1 \sin \theta + D_2 \cos \theta)$$

In FIG. 5(b), the decrement of thickness Δh in the direction of height, shown on the left side, is given by the following equation in comparison with the case (prior art example) where the speaker 2 is fitted in parallel to the side surface of the information processing apparatus main body 1 shown on the right side:

$$\Delta h = r_1 - (r_1 \sin \theta + D_1 \cos \theta - r_3 \sin \theta)$$

Here, symbol $r_2$ represents the half of the difference between the outer diameter $r_1$ of the speaker 2 at its outer peripheral portion and the outer diameter $r_3$ at its center portion, that is, $r_2 = (r_1 - r_2)/2$.

As described above, the Δh value is different, depending on the shape of the speaker 2, that is, the outer diameter $r_1$ of the speaker, the thickness $D_1$ at the center portion, the thickness $D_2$ at the peripheral portion, the diameter at the center portion etc., but in all the embodiments, the size in the direction of height can be reduced by maximum Δh.

FIG. 6 shows the case where the speaker 2 is fitted to the upper surface, at which the operation surface of the information processing apparatus main body 1 exists (prior art example) and the speaker 2 is fitted obliquely at an angle θ with respect to the reference surface of the information processing apparatus main body 1 on the up side (this invention). In this case, symbol Δw represents the decrement in the direction of the plane, and this Δw is given by the following equation:

$$\Delta w = r_1 - r_1 \cos \theta$$

In this case, the installation area of the speaker 2 can be reduced by a maximum of Δw in the planar direction without being much affected by the shape of the speaker 2. Therefore, the dimension of the information processing apparatus main body 1 itself can be reduced by maximum Δw on the right and left sides, too.

Figure 7:
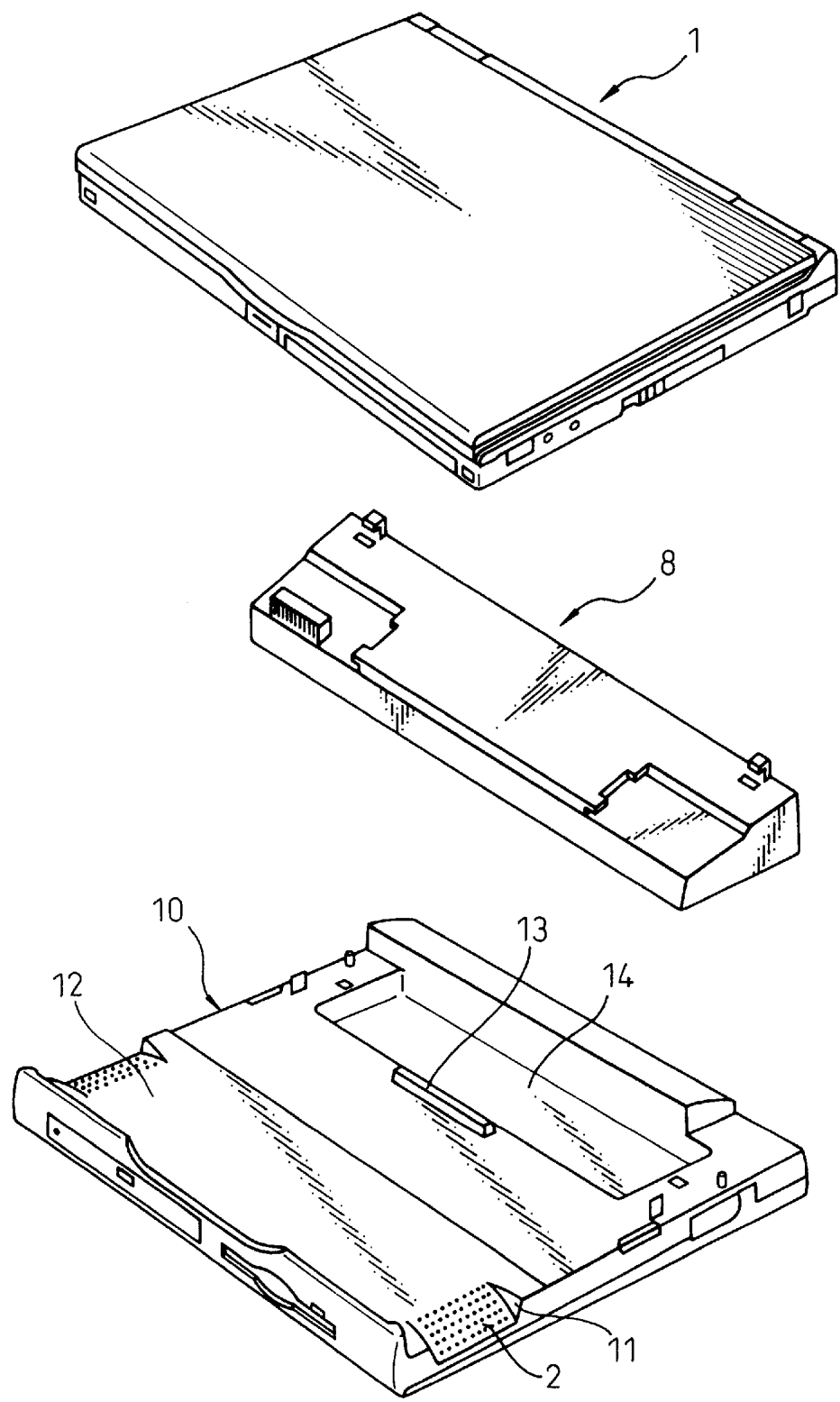
FIG. 7 is a perspective view of the main body of an information processing apparatus, an add-in battery and an extended (e.g., docking) station.
Figure 8:
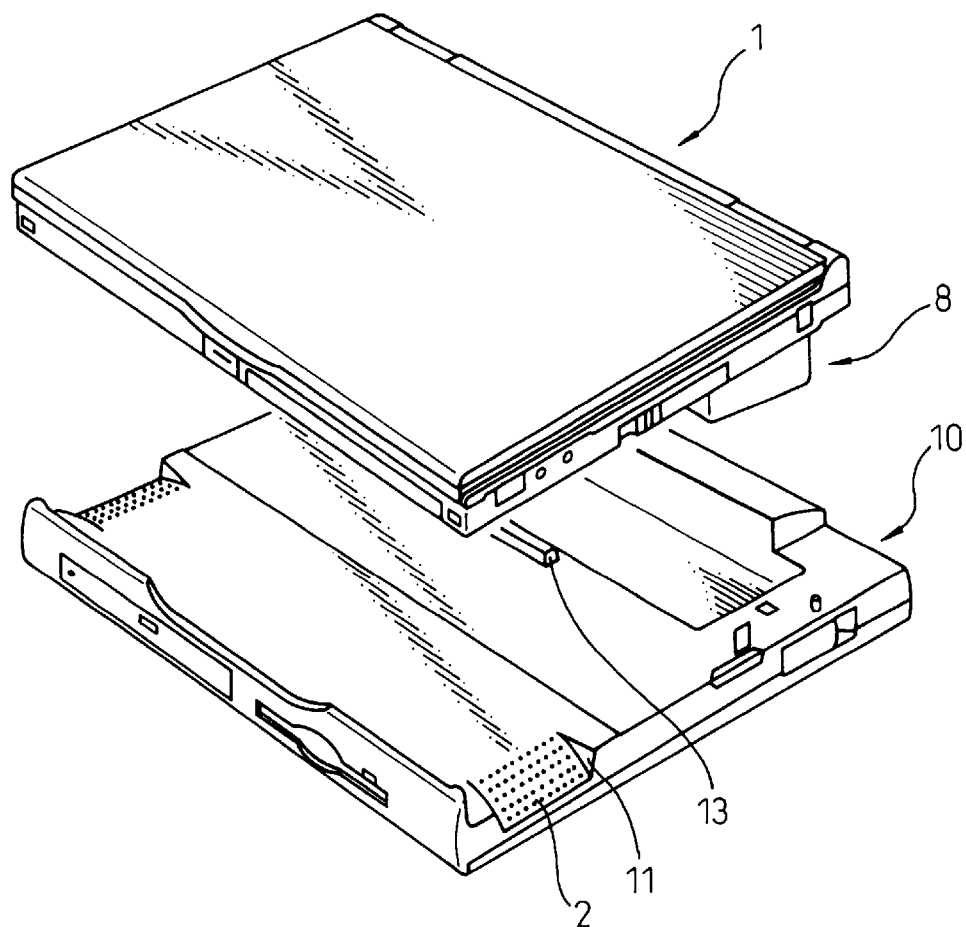
FIG. 8 is a perspective view showing the state where the add-in battery is loaded to the main body of the information processing apparatus.
Figure 9:
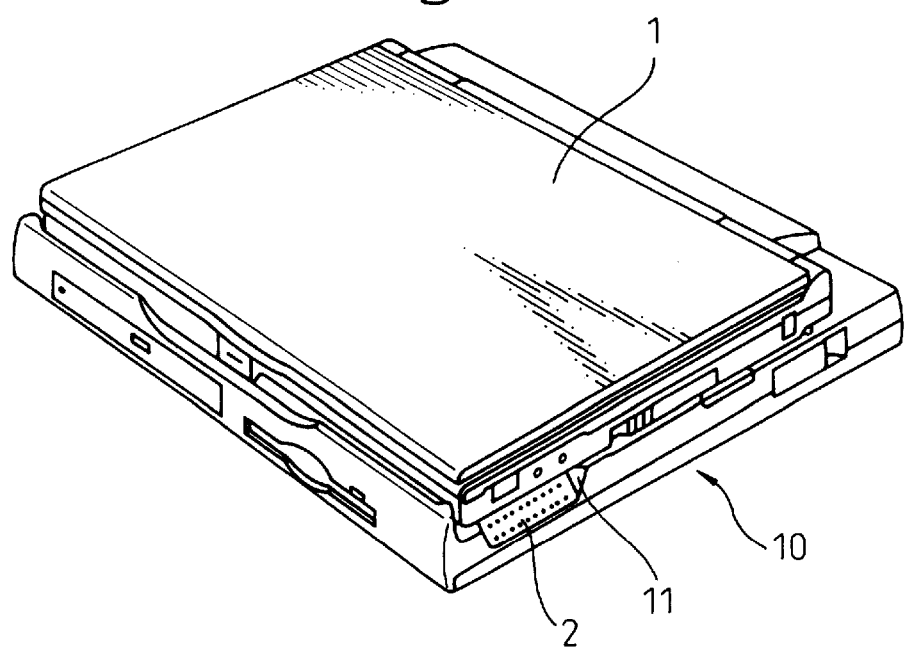
FIG. 9 is a perspective view showing the state where the information processing apparatus and the add in battery are further fitted to the extended (e.g., docking) station.

FIG. 7 is a perspective view of the information processing apparatus main body 1, the add-in battery 8 and the extended (docking) station 10 having the speakers 2 accommodated and mounted therein in the same way as in the embodiment shown in FIG. 3. FIG. 8 is a perspective view showing the state where the add-in battery 8 is loaded to the information processing apparatus main body 1, and FIG. 9 is a perspective view showing testate where they are further loaded to the extended station 10.

The add-in battery 8 can be removably fitted to the information processing apparatus 1 as described above. According to the present invention, however, the add-in battery 8 can be further loaded to the extended station while it is kept loaded to the information processing apparatus main body 1. Therefore, the extended station 10 is provided with a recess 14 for accepting the add-in battery 8. Since this recess 14 is not a mere opening but is a recess, a wiring pattern such as a printed board for supplying and transmitting power and signals between regions at the front and back of the extended station can be disposed below this recess 14 and the space can be therefore utilized effectively.

Incidentally, when the information processing apparatus main body is loaded onto the extended station 10, the connector (not shown) disposed on the back surface of the information processing apparatus main body fits to the connector of the extended station 10 and establishes the electrical connection between them.

Furthermore, the speakers 2 are disposed on front portions of respective sides of the extended station 10. These speakers are inclined downwardly towards the respective side edges. Therefore, thin speakers 2 can be effectively disposed. The back surface of the information processing apparatus main body 1 keeps contact with the upper surface 12 of the extended station 10 under the state where the information processing apparatus main body 1 is loaded. Because the speakers 2 on both sides are inclined, however, the gaps are defined between the speakers 2 and the back (i.e., bottom) surface of the information processing apparatus main body, and the speaker sound can be effectively diffused.

As described above, according to the present invention, the speakers are fitted in such a manner that their sound radiation surfaces are inclined in fixed relationship relatively to a main surface of the body 1 with respect to the reference surface of the main body of the information processing apparatus. Therefore, in comparison with the case where the speakers are merely fitted to the side surfaces of the information processing apparatus, the height can be reduced, and the thickness of the apparatus main body can be reduced. Further, the installation area of the speakers on the projection surface can be reduced and the area for the speaker surface can be sufficiently secured in comparison with the case where the speakers are disposed so that their sound radiation surfaces exist on the projection surface of the information processing apparatus main body.

Since the gap is formed in front of the sound radiation surface of each speaker, the gap portion of the front surface of each speaker serves as a sound diffusion area, and tone quality of the speaker can be improved.

It should be understood by those skilled in the art that the foregoing description relates to only some preferred embodiments of the disclosed invention, and that various changes and modifications may be made to the invention without departing from the spirit and scope thereof.

What is claimed is:

1. A portable type information processing apparatus, comprising:
    a body having a display section pivotally connected to said body and movable between a closed position and an open position relative to the body, a main reference surface, a periphery surrounding the main reference surface and having a notch at a fixed location within the body, the notch having an inclined surface at a fixed relationship with respect to said main reference surface; and a speaker, disposed within the body and having an uncovered sound radiation surface when the display section is moved to the closed position, the sound radiation surface being disposed on said inclined surface of said notch, the speaker being fixedly mounted to the body and immobile relatively thereto.

2. A portable type apparatus as set forth in claim 1, wherein the notch defines a corresponding gap at a front part of the sound radiation surface of the speaker.

3. An information processing apparatus as recited in claim 2, wherein the body has a thickness measured transversely to the main reference surface thereof which is substantially equal to the height of the speaker in a direction transverse to the main reference surface and such that the speaker is contained within the thickness of the body.

4. An information processing apparatus as recited in claim 1, wherein the body has a thickness measured transversely to the main reference surface thereof which is substantially equal to the height of the speaker in a direction transverse to the main reference surface and such that the speaker is contained within the thickness of the body.

5. A portable type information processing apparatus of claim 1, wherein an upper part of the notch is open.

6. A portable type information processing apparatus of claim 1, wherein an upper part of the notch is closed.

7. A portable type apparatus as set forth in claim 1, wherein an angle between the inclined surface and said main reference surface is selected to optimize the sound radiating area of the speaker relative to the thickness of the body.

8. A portable type information processing apparatus, comprising:
    a body having a display section pivotally connected to said body and movable between a closed position and an open position relative to the body, a main reference surface, a periphery surrounding the main reference surface including respective left and right sidewalls and having first and second notches within the body, the first notch extending inwardly from the left sidewall and the second notch extending inwardly from the right sidewall at respective, first and second fixed locations within the body, each notch having an inclined surface at a fixed relationship with respect to said main reference surface; and
    a pair of speakers having respective uncovered sound radiation surfaces when the display section is moved to the closed position, the sound radiation surfaces being disposed on the inclined surfaces of the first and second notches extending inwardly from the left and right sidewalls, respectively, each of the speakers being fixedly mounted to the body and immobile relatively thereto.

9. A portable type apparatus as set forth in claim 8, wherein a gap is defined at a front part of the respective sound radiation surface of each of the speakers, adjacent a respectively corresponding sidewall of the body.

10. An information processing apparatus as recited in claim 8, wherein the body has a thickness measured transversely to the main reference surface thereof which is substantially equal to the height of the speaker in a direction transverse to the main reference surface and such that the speaker is contained within the thickness of the body.

11. A portable type information processing apparatus of claim 8, wherein upper parts of the first and second notches are open.

12. A portable type information processing apparatus of claim 8, wherein upper parts of the first and second notches are closed.

13. A portable type apparatus as set forth in claim 8, wherein an angle between the inclined surface and said main reference surface is selected to optimize the sound radiating area of the speaker relative to the thickness of the body.

14. An information processing apparatus, comprising:
    a body having a main reference surface, an input section and a notch at a fixed location within the body, the notch having an inclined surface at a fixed relationship with respect to said main reference surface; and;
    a display section pivotally connected to said body and movable, as a lid, between a closed position and an open position relatively to the body; and
    a speaker mounted within the body and having an uncovered sound radiation surface when the display section is moved to the closed position, the sound radiation surface being disposed on said inclined surface of said notch, the speaker being fixedly mounted to the body and immobile relatively thereto.

15. An apparatus as set forth in claim 14, wherein a corresponding gap is defined at a front part of the respective sound radiation surface of the speaker adjacent a corresponding sidewall of the body.

16. An information processing apparatus as recited in claim 14, wherein the body has a thickness measured transversely to the main reference surface thereof which is substantially equal to the height of the speaker in a direction transverse to the main reference surface and such that the speaker is contained within the thickness of the body.

17. A portable type apparatus as set forth in claim 14, wherein an angle between the inclined surface and said main reference surface is selected to optimize the sound radiating area of the speaker relative to the thickness of the body.

18. An information processing apparatus having a pair of speakers, the apparatus comprising:
    a body having a main reference surface, an input section, left and right sidewalls and first and second notches disposed at respective, first and second fixed locations within the body, the first notch extending inwardly from the left sidewall and the second notch extending inwardly from the right sidewall, each notch having an inclined surface at a fixed relationship with respect to said main reference surface;
    a display section pivotally connected to the body and movable, as a lid, between closed and open position relatively to the body; and
    the pair of speakers being arranged within the body respectively at the first and second notches in the left and right sidewalls, the speakers having corresponding sound radiation surfaces disposed on the corresponding inclined surfaces of the first and second notches, respectively, and being fixedly mounted to the body so as to be immobile relatively thereto.

19. An apparatus as set forth in claim 18, wherein a gap is defined at the front part of the respective sound radiation surface of each of the speakers, adjacent the corresponding sidewalls of the body.

20. An information processing apparatus as recited in claim 18, wherein the body has a thickness measured transversely to the main reference surface thereof which is substantially equal to the height of the speaker in a direction transverse to the main reference surface and such that the speaker is contained within the thickness of the body.

21. A portable type apparatus as set forth in claim 18, wherein an angle between the inclined surface and said main reference surface is selected to optimized the sound radiating area of the speaker relative to the thickness of the body.

22. An electronic device used for detachably mounting thereon a computer and comprising:
a body having a display section pivotally connected to said body and movable between a closed position and an open position relative to the body, a main reference surface, a periphery surrounding the main reference surface and a notch at a fixed location within the body and having an inclined surface at a fixed relationship with respect to said main reference surface; and
a speaker disposed in and fixedly mounted to the device so as to be immobile relatively thereto, the speaker having an uncovered sound radiation surface when the display section is moved to the closed position, the sound radiation surface being disposed on said inclined surface of said notch.

23. An electronic device as set forth in claim 22, wherein the computer to be mounted on the electronic device has a battery attached thereto, the electronic device further comprising a recess which accommodates the battery when the computer having the battery attached thereto is mounted thereon.

24. An electronic device as recited in claim 22, wherein the body has a thickness measured transversely to the main reference surface thereof which is substantially equal to the height of the speaker in a direction transverse to the main reference surface and such that the speaker is contained within the thickness of the body.

25. An electronic device of claim 22, wherein an upper part of the notch is open.

26. A portable type apparatus as set forth in claim 22, wherein an angle between the inclined surface and said main reference surface is selected to optimize the sound radiating area of the speaker relative to the thickness of the body.

27. An electronic device being used for detachable mounting thereon of a computer and comprising:
a body having a display section pivotally connected to said body and movable between a closed position and an open position relative to the body, a main reference surface, a periphery surrounding the main reference surface including respective left and right sidewalls and having first and second notches at fixed locations in the respective first and second sidewalls, the first notch extending inwardly from the left sidewall and the second notch extending inwardly from the right sidewall, the notches having corresponding inclined surfaces, each at a fixed relationship with respect to said main reference surface; and
a pair of speakers having corresponding uncovered sound radiation surfaces when the display section is moved to the closed position, the sound radiation surfaces being disposed on the corresponding inclined surfaces of the left and right sidewalls, respectively, and fixedly mounted to the body at the respective, fixed locations so as to be immobile relatively to the body.

28. An electronic device as recited in claim 27, wherein the body has a thickness measured transversely to the main reference surface thereof which is substantially equal to the height of the speaker in a direction transverse to the main reference surface and such that the speaker is contained within the thickness of the body.

29. An electronic device of claim 27, wherein upper parts of the first and second notches are open.

30. A portable type apparatus as set forth in claim 27, wherein an angle between the inclined surface and said main reference surface is selected to optimize the sound radiating area of the speaker relative to the thickness of the body.

31. A portable-type information processing apparatus, comprising:
a body having a display section pivotally connected to said body and movable between a closed position and an open position relative to the body, a main reference surface and having a sidewall and a body thickness transverse to the main reference surface;
the body further comprising a first notch therein, extending inwardly from the first sidewall and having an upper planar boundary parallel to the main reference surface and a lower inclined surface extending from the interior of the body at an oblique downward angle, relatively to the main reference surface, and toward the sidewall; and
a first speaker, mounted in the first notch, having an uncovered sound radiation surface when the display section is moved to the closed position, the sound radiation surface being disposed on the lower inclined surface thereof.

32. A portable-type information processing apparatus as recited in claim 31 wherein the body has a thickness, measured transversely to the main reference surface thereof, which is substantially equal to the height of the speaker in a direction transverse to the main reference surface and such that the speaker is contained within the thickness of the body.

33. A portable-type information processing apparatus as recited in claim 31, wherein:
the body further comprises a second notch therein, extending inwardly from the sidewall and having an upper planar boundary parallel to the main reference surface and a lower inclined surface extending from the interior of the body at an oblique downward angle, relatively to the main reference surface and toward the sidewall; and
a second speaker, mounted in the second notch, having a sound radiation surface thereof positioned on the lower inclined surface and disposed at the oblique downward angle.

34. A portable-type information processing apparatus as recited in claim 33, wherein the body has a thickness measured transversely to the main reference surface thereof which is substantially equal to the height of the speaker in a direction transverse to the main reference surface and such that each of the first and second speakers is contained within the thickness of the body.

35. A portable-type information processing apparatus as recited in claim 31, further comprising:
a display section pivotally connected to the body and movable, as a pivotal lid, between a closed position on the upper planar boundary and an open position relative to the upper planar boundary; and
a speaker, disposed within the body and having an uncovered sound radiation surface when the display section is moved to the closed position.

* * * * *